Figure 1:
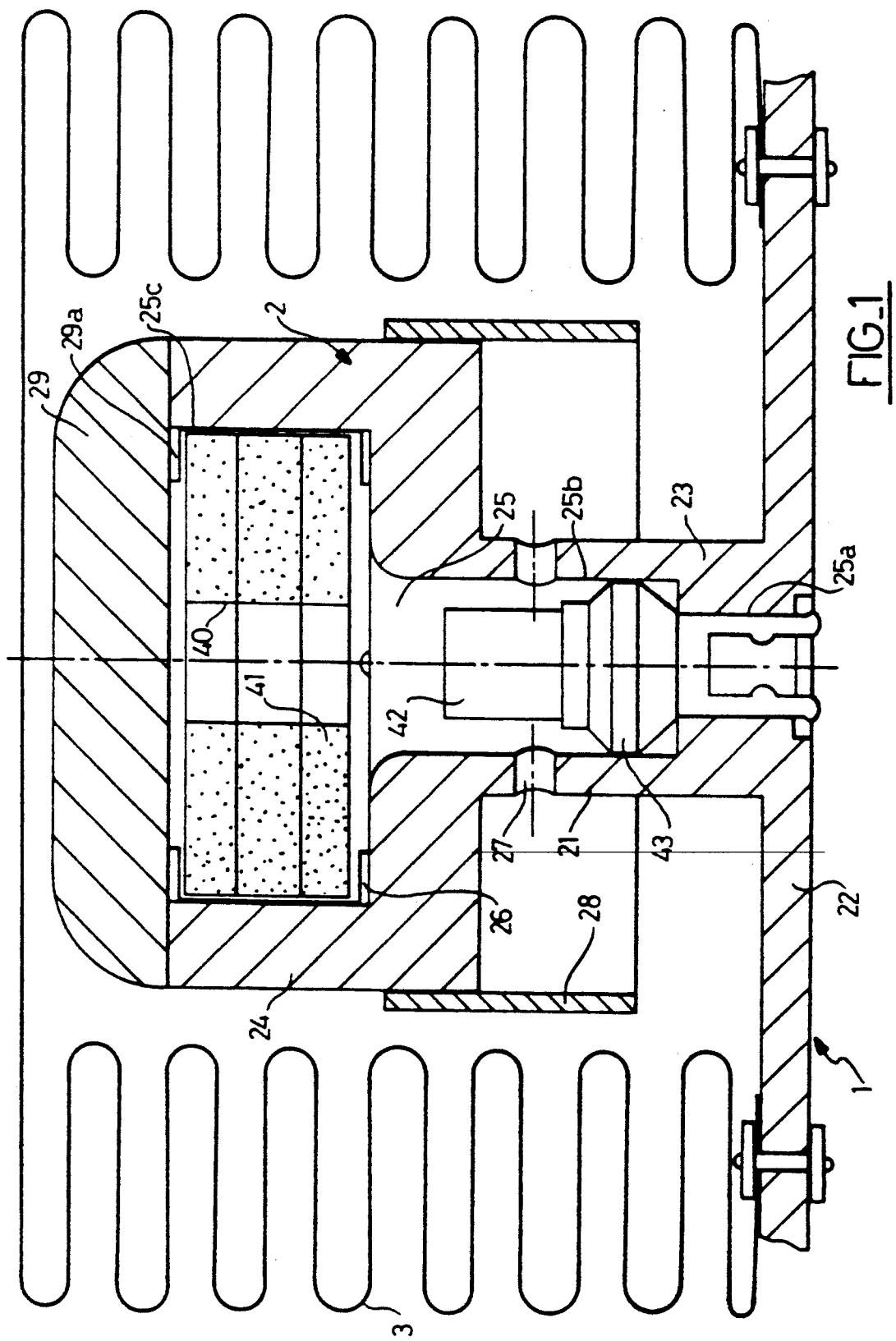

United States Patent [19]

Castagner et al.

[11] Patent Number: 5,160,163
[45] Date of Patent: Nov. 3, 1992

[54] IMPACT-ABSORBING DEVICE FOR OCCUPANTS OF A MOTOR VEHICLE AND USE OF THIS DEVICE

[75] Inventors: Bernard Castagner, Coupvray; Paul-Philippe Cord, Paris; Bernard Doin, Versailles; Michel Kozyreff, Catenay, all of France

[73] Assignee: S.N.C. Livbag, Vert Le Petit, France

[21] Appl. No.: 583,332

[22] Filed: Sep. 17, 1990

[30] Foreign Application Priority Data

Sep. 27, 1989 [FR] France ............... 89 12629

[51] Int. Cl.⁵ ............... B60R 21/26; B60R 21/28
[52] U.S. Cl. ............... 280/740; 280/733; 280/742; 280/741; 280/743
[58] Field of Search ............... 280/728, 729, 733, 736, 280/740, 741, 742, 743; 149/19.4, 92, 95, 97

[56] References Cited

U.S. PATENT DOCUMENTS

| | | | |
|---|---|---|---|
| 3,351,019 | 11/1967 | Schaadt et al. | 149/97 |
| 3,532,358 | 10/1970 | Selwa et al. | 280/741 |
| 3,552,770 | 1/1971 | Berryman | 280/740 |
| 3,715,131 | 2/1973 | Hurley et al. | 280/736 |
| 3,840,246 | 10/1974 | McCullough, Jr. et al. | 280/738 |
| 3,845,970 | 11/1974 | Herrmann | 280/741 |
| 3,865,660 | 2/1975 | Lundstrom | 280/741 |
| 3,888,504 | 6/1974 | Bonn et al. | 280/743 |
| 3,892,425 | 7/1975 | Sakairi et al. | 280/743 |
| 3,907,327 | 9/1975 | Pech | 280/743 |
| 4,178,017 | 12/1979 | Ishi et al. | 280/742 |
| 4,265,468 | 5/1981 | Suszko et al. | 280/732 |
| 4,381,829 | 5/1983 | Montaron | 280/733 |
| 4,408,534 | 10/1983 | Araki et al. | 149/97 |
| 4,805,930 | 2/1989 | Takada | 280/743 |
| 4,830,401 | 5/1989 | Honda | 280/743 |
| 4,921,735 | 5/1990 | Bloch | 280/743 |

FOREIGN PATENT DOCUMENTS 420726 4/1991 European Pat. Off. ............ 280/728
90/05651 5/1990 PCT Int'l Appl. .

Primary Examiner—Charles A. Marmor
Assistant Examiner—Tamara L. Graysay
Attorney, Agent, or Firm—Cushman, Darby & Cushman

[57] ABSTRACT

A device for protecting, by impact absorption, the occupants of a motor vehicle in the event of a collision includes a pyrotechnic generator (2) of hot gases, the temperature of which at the outlet of the generator is equal to at least 1,800° C. and a sealed or virtually sealed inflatable bag (3) fastened to the said generator. Communication between the bag (3) and the generator (2) is ensured by openings (27) with a constant cross-section arranged on the generator and by a deflector (28). The invention also relates to the use of a device of this type combined with a seat belt, in particular in order to improve the protection of motor vehicle drivers.

6 Claims, 3 Drawing Sheets

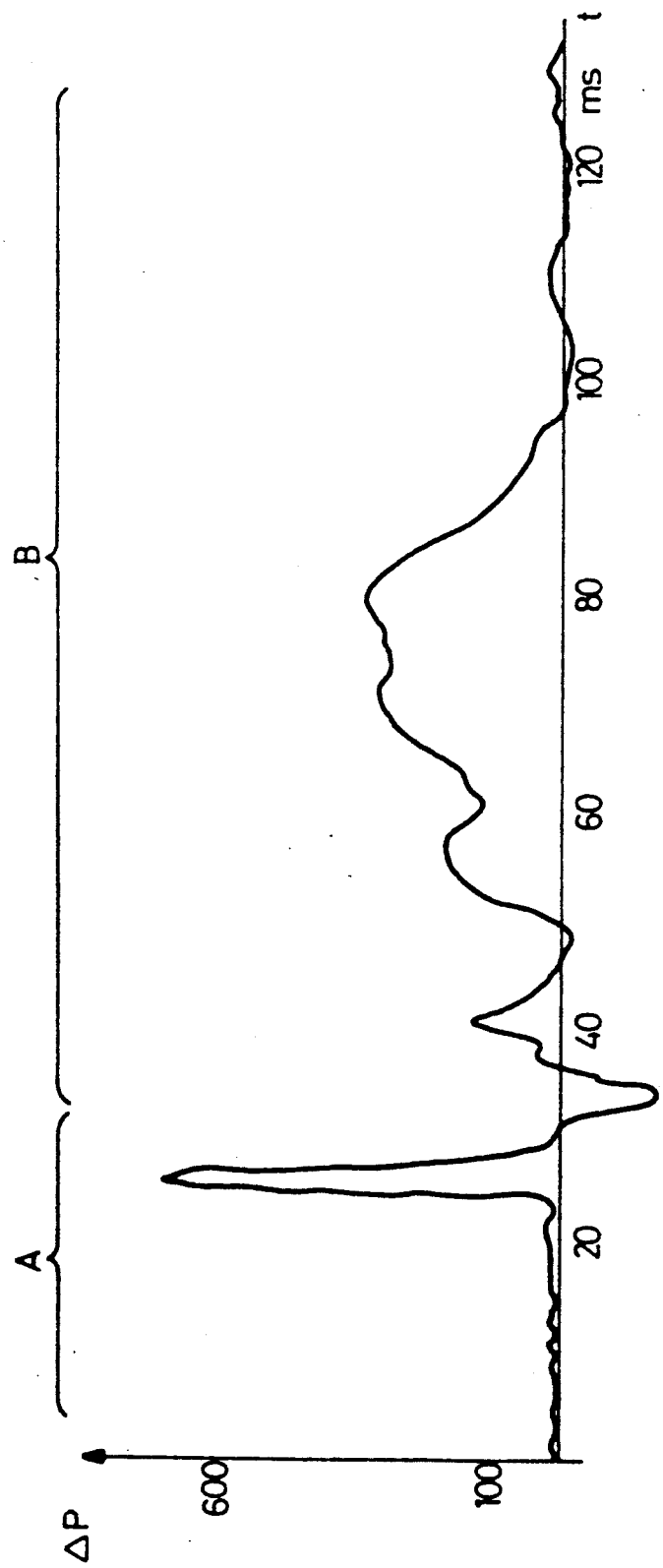
FIG._3

IMPACT-ABSORBING DEVICE FOR OCCUPANTS OF A MOTOR VEHICLE AND USE OF THIS DEVICE

The present invention relates to the field of automobile safety. More precisely, the invention concerns a device for protecting, by impact absorption, the occupants of a motor vehicle in the event of a collision. The device according to the invention essentially consists of a pyrotechnic gas generator, an inflatable bag and joining members which enable the said gas generator to be connected to the said bag.

It is known to ensure the safety of the occupants of a motor vehicle in the event of a collision by means of a sealed protective bag inflated by a gas, the said bag coming between the body or the face of the occupant of the vehicle and the walls of the vehicle which are situated in front of this occupant so as to prevent the latter from being crushed against these walls. These inflatable bags are generally inflated by a pyrotechnic gas generator connected on the one hand to an impact detector and on the other hand to the said bag. A device of this type is, for example, described in U.S. Pat. No. 3,845,970 which describes a gas generator connected to a sealed inflatable bag via nozzles which ensure, by the release of gases, the cooling of these gases. This type of solution successfully enables the forward movement of the body of the occupant of the vehicle to be cushioned.

This type of solution nevertheless has the disadvantage of being difficult to adjust. Indeed, in order to achieve an adapted inflation of the bag with relatively cooled gases, a relatively large quantity of these gases must be employed but on the other hand if the bag is over-inflated, it no longer has sufficient cushioning properties for the body of the occupant of the vehicle.

In order to overcome this disadvantage, devices were provided which are similar but in which the inflatable bag is provided with vents which enable, after inflation, the excess gas to escape under the pressure of the body of the occupant of the vehicle, the cushioning of which is thus absolutely ensured. Devices of this type are described in U.S. Pat. Nos. 3,840,246 and 4,805,930. This type of device, which is entirely satisfactory in the event of a single impact, nevertheless has two serious disadvantages.

On the one hand, as gas originating from the pyrotechnic generator is intended to enter inside the passenger cell of the motor vehicle through the vents, this gas must be non-toxic and as cold as possible. These two considerations entail the selection of gas-generating pyrotechnic compositions based on sodium nitride, as explained, for example, in U.S. Pat. No. 3,865,660. Now these pyrotechnic compositions based on sodium nitride are not without disadvantages:

i) they are sensitive to humidity with regard to toxicity and aging and must therefore be completely isolated in the gas generator from the surrounding atmosphere, ii) they generate by combustion a substantial quantity of hot, toxic and corrosive solid residues which must be carefully filtered before the inlet of the gases into the bag, iii) lastly, sodium nitride is a toxic product which is awkward to neutralize at the end of the life of the vehicle.

Moreover, and this is undoubtedly the major disadvantage of this type of solution, protection of the occupant of the vehicle is not ensured in the event of multiple impacts since the bag, as a result of the vents, loses a considerable part of its gas after the first impact.

Attempts have been made in this regard to obtain devices in which the bag does not deflate entirely upon the first impact and which preserve a degree of efficiency in the event of multiple impacts. One solution proposed consists in employing bags comprising several chambers, some of which are sealed and others of which are provided with vents.

This type of solution, described, for example, in U.S. Pat. No. 3,907,327 nevertheless has the disadvantage of requiring a complex structure with at least two coverings for the inflatable bag and of being both expensive and relatively awkward to employ.

At the present time, a person skilled in the art therefore does not have available any simple device for protecting the occupants of a motor vehicle, consisting of a pyrotechnic gas generator and an inflatable bag which both cushions in all conditions of use and preserves a degree of efficiency in the event of multiple impacts.

The object of the present invention is precisely to provide such a protective device by using, in order to ensure the inflation of the bag, a small quantity of very hot gases which are not very toxic as they are produced at a temperature which does not correspond to the formation of carbon monoxide.

The invention therefore relates to an impact-absorbing device for the occupants of a motor vehicle consisting of a hot-gas pyrotechnic generator and an inflatable bag fastened to the said generator, characterized in that:

i) the said hot-gas generator produces gases, the temperature of which at the outlet of the generator is equal to at least 1,800° C., ii) the said inflatable bag is a sealed or virtually sealed bag, iii) the said inflatable bag communicates with the said hot-gas generator by means enabling the speed of the gases to be reduced without substantially cooling them.

According to a first preferred variant of the invention, the said means ensuring the communication of the inflatable bag with the generator comprise at least one opening with a constant, or virtually constant cross-section arranged on the gas generator and a deflector.

According to a second preferred variant of the invention, the said inflatable bag is produced in a material chosen from the group consisting of polyamide fibers.

Lastly, the invention also relates to the use of this device combined with a seat belt.

The novelty of the invention lies in the fact that, contrary to the general teaching of the prior art which recommends inflating the protective bag with a large quantity of cold or warm gases, the device according to the invention ensures the inflation of the protective bag with a small quantity of gases which are as hot as possible and which there is no attempt to cool before their inlet into the protective bag. As a result of their high temperature, these gases ensure that there is a sufficient pressure to ensure the inflation of the bag but, at the same time, they cool down very quickly, their total mass being small, and thus ensure the reduction in volume which gives the bag the cushioning properties in all the forms of use. Moreover, since the bag is sealed or virtually sealed, it preserves a degree of efficiency, even in the event of multiple impacts.

Figure 2:
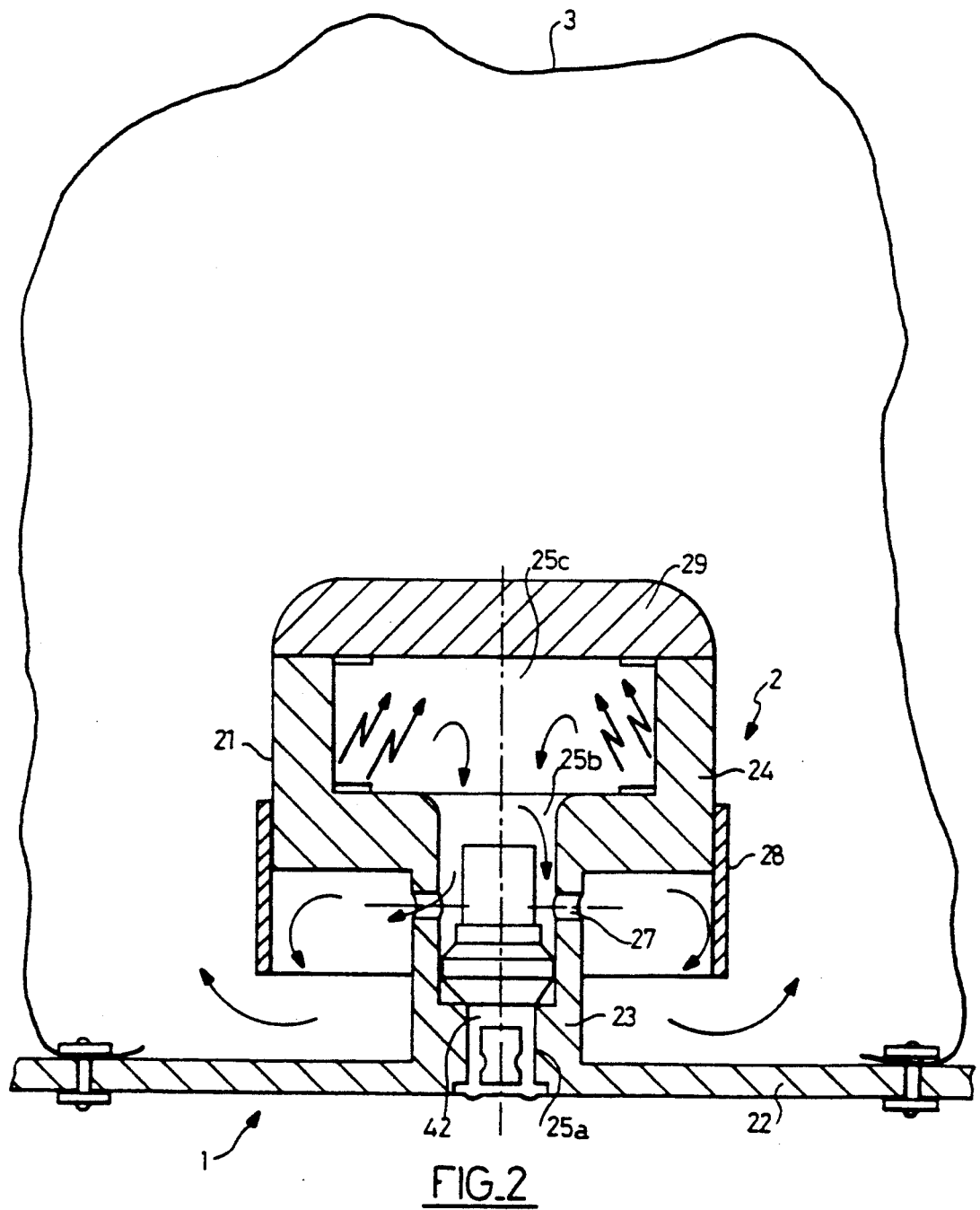

The invention is now described in detail with reference to FIGS. 1 to 3:

FIG. 1 shows, seen in cross-section, a device according to the invention before operation, FIG. 2 shows, seen in cross-section, the same device during operation, FIG. 3 is a curve showing the development of the pressure during operation in the inflatable bag of a device according to the invention.

A device 1 according to the invention essentially comprises:

a hot-gas pyrotechnic generator 2, an inflatable bag 3 fastened to the said generator 2, means for communication between the said generator and the said inflatable bag.

The generator 2 shown in FIG. 1 consists of a body of revolution 21 comprising a cylindrical base 22 on which is mounted a cylindrical foot 23 ending in a cylindrical receptacle 24, the outer diameter of the foot 23 being less than the outer diameters of the receptacle 24 and the base 22. The said body 21 is traversed by an axial bore 25 comprising three parts with different diameters:

a lower part 25a, situated at the base 22 and the beginning of the foot 23, with a small diameter, a mid part 25b with a diameter greater than that of the lower part 25a, an upper part 25c with a diameter greater than that of the mid part 25b.

The upper part 25c of the bore 25 is provided with ribs 26 and forms the combustion chamber of the generator, whereas the mid part 25b and the lower part 25a form the ignition chamber for the generator.

A cover 29 is fastened, for example by welding, onto the plane face of the receptacle 24. Advantageously, as shown in FIG. 1, this cover may be provided with ribs 29a which penetrate the combustion chamber 25c of the generator.

The body 21 of the generator and its cover 29 are advantageously formed either from a light metal such as aluminium or aluminium alloys, or from plastic materials which are capable for a very short period of time of resisting elevated temperatures such as, for example, plastic materials reinforced with glass fibers or carbon fibers or, alternatively, glass or carbon fabrics with a thermostable thermoplastic matrix.

According to a first essential feature of the invention, the generator must produce hot gases whose temperature at the outlet of the generator is equal to at least 1,800° C. and, preferably, near 2,000° C.

In order to achieve this, a gas-generating pyrotechnic composition is employed whose flame temperature is equal to at least 1,800° C. Composite powders consisting of an organic binder such as a polyurethane and of a nitramine such as hexogen or octogen or, alternatively, powders with two bases formed from a mixture of nitrocellulose and nitroglycerine or some powders with a single nitrocellulose base will be preferred as the pyrotechnic composition.

The fundamental importance in the scope of the present invention of the use of a composition generating very hot gases will be explained later on in the present description.

A charge 40 of a hot gas-generating composition arranged inside the combustion chamber 25c has been shown in FIG. 1. This charge consists of three rings 41 of a gas-generating composition superposed on top of each other and immobilized by the ribs 26 and 29a carried by the combustion chamber 25c and by the cover 29.

Ignition of the gas-generating composition is ensured by an igniter. An igniter 42 arranged in the lower part 25a and in the mid part 25b of the axial bore 25 has been shown in FIG. 1. In this type of configuration, the igniter 42 is introduced into the body 21 of the generator through the combustion chamber 25c and force-wedged by its wide part 43 into the mid part 25b which may advantageously have a slightly tapered section. The charge 40 is then placed in the combustion chamber 25c and the cover 29 is then fastened sealingly onto the body 21.

The generator 1 is surrounded by an inflatable bag 3, as shown in FIG. 1. This inflatable bag must, for reasons which will be explained later on in the description, be capable of resisting for a very short period of time the elevated temperature of the hot gases produced by the gas generator and is preferably made from a material selected from the groups consisting of polyamide fibers and, more generally, any fiber with an equivalent property.

According to a second essential feature of the present invention, this bag must be sealed or virtually sealed.

When a sealed bag is used, its inner surface will advantageously be covered by a coating product which is impermeable to the gases, such as a gum or, alternatively, a neoprene polymer. In some cases, it will, however, be preferred to use bags which are virtually sealed and have a slight porosity. In this scenario, the inner surface of the bag will only be partially covered by a coating product or will even be completely free of one. In order to further increase the porosity, it will also be possible to provide small orifices traversing the wall of the inflatable bag.

According to a variant of the invention, the presence of products capable of absorbing or dissociating carbon monoxide can also be provided inside the inflatable bag. Products of this type consist in particular of active carbon or of mixtures of manganese, copper, cobalt and silver oxides such as, for example, the mixture marketed under the trade name "HOPCALITE" ®.

According to a third essential feature of the invention, the said inflatable bag communicates with the said hot-gas generator by means which enable the speed of the gases to be reduced without substantially cooling them. In fact, for reasons which will be explained a little later on, it is essential within the scope of the present invention, and this is contrary to all the teaching of the prior patents which had recourse to hot-gas generators such as U.S. Pat. No. 3,845,970, that the gases which enter the inflatable be as hot as possible and do not undergo any cooling by a reduction of pressure. This consideration prevents in particular, within the scope of the present invention, the use of nozzles with a throat of the "converging—diverging" type to ensure the communication between the hot-gas generator and the inflatable bag.

According to a preferred embodiment of the invention, the means ensuring the communication between the inflatable bag and the generator consist of at least one opening with a constant or virtually constant cross-section arranged on the body or the cover of the generator, or, and of a deflector. The openings arranged on the generator are calculated by a person skilled in the art so as to ensure a sufficient pressure in the combustion chamber to maintain a combustion speed compatible with the response times demanded in automobile safety, whilst at the same time avoiding an excessively high heat loss of the gases upon impact of the latter against the deflector. The openings have a constant or slightly variable cross-section—this is what is meant in the sense of the present description by the expression "virtually constant".

The function of the deflector is to ensure penetration of the hot gas into the bag around the entire periphery of the generator and to avoid the penetration of these hot gases in the form of jets which could damage the covering of the inflatable bag.

Openings 27 with a constant circular cross-section and arranged in the mid part 25b of the bore 25 and the axes of which are perpendicular to the axis of the bore 25 have been shown in FIG. 1. The deflector 28 consists of a cylindrical wall fastened to the base of the receptacle 24 of the body 21 of the generator and opposite the said orifices 27. These orifices 27 will advantageously be covered by a material which can be easily destroyed by the hot gases, such as an aluminium foil, so as to promote the ignition of the charge 40 and the rise in pressure.

The deflector may consist of a separate piece of the body 21 of the generator fastened to the latter, as shown in FIG. 1, or, alternatively, consist of an integral part of the latter. The base 22 of the body of the generator may in particular perform the role of deflector where the openings have axes parallel to that of the bore 25 or axes inclined relative to the latter.

The operation of the device according to the invention is described hereinbelow with reference more particularly to FIG. 2.

When necessary, an electrical pulse triggered by a collision detector, not shown in the figures, lights the igniter 42 which ignites the charge 40 of a hot gas-generating composition.

These hot gases leave the generator through the openings 27, are distributed over the entire periphery of the generator 2 as a result of the deflector 28 and inflate the bag 3. It should be noted that in these conditions the hot gases coming from the combustion chamber undergo virtually no heat loss. In fact, on the one hand, by their construction, the openings 27 do not perform the role of a nozzle and, on the other hand, the deflector 28 serves chiefly to distribute the gases around the entire periphery of the generator without absorbing a substantial amount of energy, the number and the surface area of the orifices 27 having been calculated to avoid an excessively high gas-outlet speed. It is therefore very hot gases, at a temperature substantially equal to at least 1,800° C., which enter the inflatable bag 3.

The latter inflates very quickly, even with a small number of gas molecules. Indeed, this is precisely where the fundamental originality of the invention lies: the inflation of the bag is ensured with a small quantity of very hot gas, requiring for its production a small quantity of a pyrotechnic composition relative to the required quantities for a bag with an equal volume, with cold-gas generating compositions such as nitride compositions, or even hot-gas generating compositions cooled before entering the bag. By way of a guide, 80 g of a nitride-based composition are needed to inflate a 60-liter bag in a traditional device, whereas less than 16 g of powder with two bases, a nitroglycerine and a nitro-cellulose base, are sufficient with a device according to the invention. However, at the same time as the inflation of the bag is ensured, the gases cool down very quickly in the bag by heat exchange with the latter, an exchange which is all the more quick since the gas is only present in a small quantity in the bag. It should be noted that the rise in temperature of the bag remains moderate, taking into consideration the ratio between the mass of the bag and that of the gases, which is generally greater than 10.

The bag deflates a little because of the cooling of the gases, which improves the cushioning as a result of the larger contact surface area between the occupant of the motor vehicle and the bag, and this is achieved from the first impact. It is in order to improve the cushioning properties of the bag, associated with its partial deflation, that it may be desirable to have a degree of porosity for the covering of the bag.

According to a preferred embodiment of the invention, a quantity of hot gases is used such that the pressure reached in the bag just after inflation is between 1,000 and 1,200 millibars ($1.0 \times 10^5$ Pa and $1.2 \times 10^5$ Pa).

It should be observed that, even with a bag having a degree of porosity, there is no risk for the occupants of the vehicle with regard to the toxicity of the gases. Indeed, on the one hand each bag is inflated with a small quantity of gas of which only a small part will spread into the vehicle, and on the other hand the gases contain very little carbon monoxide as they have been produced at temperatures which correspond more to the formation of carbon dioxide than the formation of carbon monoxide. Moreover, the presence in the bag of products capable of absorbing or dissociating carbon monoxide further reduces the risks of toxicity.

Moreover, since the bag is either completely sealed or virtually sealed with a slight porosity, it preserves in all its forms a sufficient quantity of gas to still cushion in the event of successive multiple impacts, contrary to the traditional bags provided with vents.

Two complementary advantages of the device according to the invention are the weight and the price of the device.

The device according to the invention operates with a small quantity of a pyrotechnic composition, as has been seen above, which already limits its overall size and its weight. Moreover, hot-gas generating compositions do not produce dust particles and this is true in particular for the preferred compositions of the invention, namely composite powders and powders with one or two bases. The device according to the invention therefore does not require any filtering system, which contributes greatly to reducing its weight relative to the traditional devices with a cold-gas generator. This reduction in weight is, of course, accompanied by an appreciable reduction in the price of the device according to the invention relative to the said traditional devices.

The device according to the invention is well suited to the protection of all the occupants of a motor vehicle: driver or passengers. However, the device according to the invention finds a particularly advantageous application when combined with a seat belt for protecting the driver of the vehicle. This particular application also forms part of the present invention.

In vehicles equipped with seat belts, protection of the passengers is correctly ensured. However, that of the driver is less so, since the belt does not in all cases prevent him from being thrown against the steering wheel and thus being seriously wounded.

The device according to the invention, as a result of its small size, can be housed very easily in the steering wheel of a motor vehicle so as to ensure, in the event of very sudden deceleration, the inflation of a bag which will cushion the impact of the driver as a complement to the protection offered by the belt. In the same scenario, the inflatable bag may, moreover, be a bag with a reduced volume; a bag of approximately 30 liters is well suited in this instance, requiring a generator with a very small volume. By way of a guide, a device according to the invention allows a 30-liter bag to be inflated effectively with 8 g of a powder with two bases burning at 1,800° C.

Example: an impact-absorbing device in accordance with that shown in FIG. 1 has been made.

The generator was made from aluminium. Its overall height was 46 mm and the outer diameter of the receptacle 24 was 41 mm.

The charge 40 consisted of 3 rings of a powder having two bases with the following dimensions:
outer diameter: 30 mm
inner diameter: 11 mm
thickness: 2.6 mm The composition of the powder was as follows:
nitrocellulose: 55.5 parts by weight (nitrogen content: 11.7%)
nitroglycerine: 37 parts by weight
additives: 7.5 parts by weight The flame temperature of this composition is 2,300° C. at 70 bars ($7 \times 10^6$ Pa).

The generator was provided with 4 openings 27, each having a diameter of 2 mm.

The bag was a 30-liter polyamide bag without
The inner surface of the bag was not coated.
The curve of the development of the pressure in the bag as a function of time is indicated in FIG. 3.

This curve shows the development of the difference in pressure ΔP expressed in millibars between the inside of the inflatable bag 3 and the pressure prevailing inside the vehicle as a function of time t expressed in milliseconds after the device was triggered.

The test was carried out with a simulated impact at 50 km/h using a dummy provided with a seat belt.

The part A of the curve corresponds to the inflation of the bag, whereas the part B corresponds to the impact of the head of the dummy against the bag.

By looking at this curve, it can be seen that the device according to the invention ensures correct inflation of the bag after approximately 30 milliseconds (part A of the curve) and that the bag which does not have any vents is then capable of cushioning the impact of the head of the dummy as a result, in particular, of the concomitant cooling of the gases.

The Head Injury Criterion used in automobile safety is in this test 590, which ranks the device according to the invention at the same level of performance as the best known devices, in particular those with vents.

We claim:

1. Impact-absorbing device (1) for the occupants of a motor vehicle comprising a hot-gas pyrotechnic generator (2) including an igniter (42) and a hot-gas generating pyrotechnic composition (40) and an inflatable bag (3) fastened to the said generator, wherein:
    the said pyrotechnic composition is chosen from the group consisting of composite powders and powders with two bases, the flame temperature of which is equal to at least 1,800° C.,
    the said inflatable bag is a virtually sealed bag,
    the inflatable bag communicates with the said hot-gas generator by means comprising at least one opening (27) with virtually constant cross section arranged on the generator and a deflector (28) wherein the said inflatable bag contains a product capable of absorbing or dissociating carbon monoxide.

2. Device according to claim 1, characterized in that the said product is chosen from the group consisting of active carbon and manganese, copper, cobalt and silver oxides.

3. Impact-absorbing device (1) for the occupants of a motor vehicle comprising a hot-gas pyrotechnic generator (2) including an igniter (42) and a hot-gas generating pyrotechnic composition (40) and an inflatable bag (3) fastened to the said generator, wherein:
    the said pyrotechnic composition is chosen from the group consisting of composite powders and powders with two bases, the flame temperature of which is equal to at least 1,800° C.,
    the said inflatable bag is a virtually sealed bag,
    the inflatable bag communicates with the said hot-gas generator by means comprising at least one opening (27) with virtually constant cross section arranged on the generator and a deflector (28) wherein the said hot-gas pyrotechnic generator (2) has a body of revolution (21) comprising a cylindrical base (22) on which is mounted a cylindrical foot (23) ending in a cylindrical receptacle (24), the outer diameter of the foot (23) being less than the outer diameters of the receptacle (24) and the base (22) and in that the said body (21) is traversed by an axial bore (25) comprising a lower part (25a), a mid part (25b) and an upper part (25c) with different diameters.

4. Device according to claim 3, characterized in that the igniter (42) is arranged in the lower part (25a) and in the mid part (25b) of the bore (25) and in that openings (27) with a constant circular cross-section are arranged in the mid part (25b) of the bore (25).

5. The device according to claim 4, combined with a seat belt.

6. Device according to claim 3 wherein the body (21) of the generator (2) comprises a plastic material reinforced with fibers chosen from the group consisting of glass fibers and carbon fibers.

* * * * *